Dec. 22, 1942.  C. S. ASH  2,305,836
DUAL WHEEL ASSEMBLY
Filed Dec. 14, 1940  2 Sheets-Sheet 1
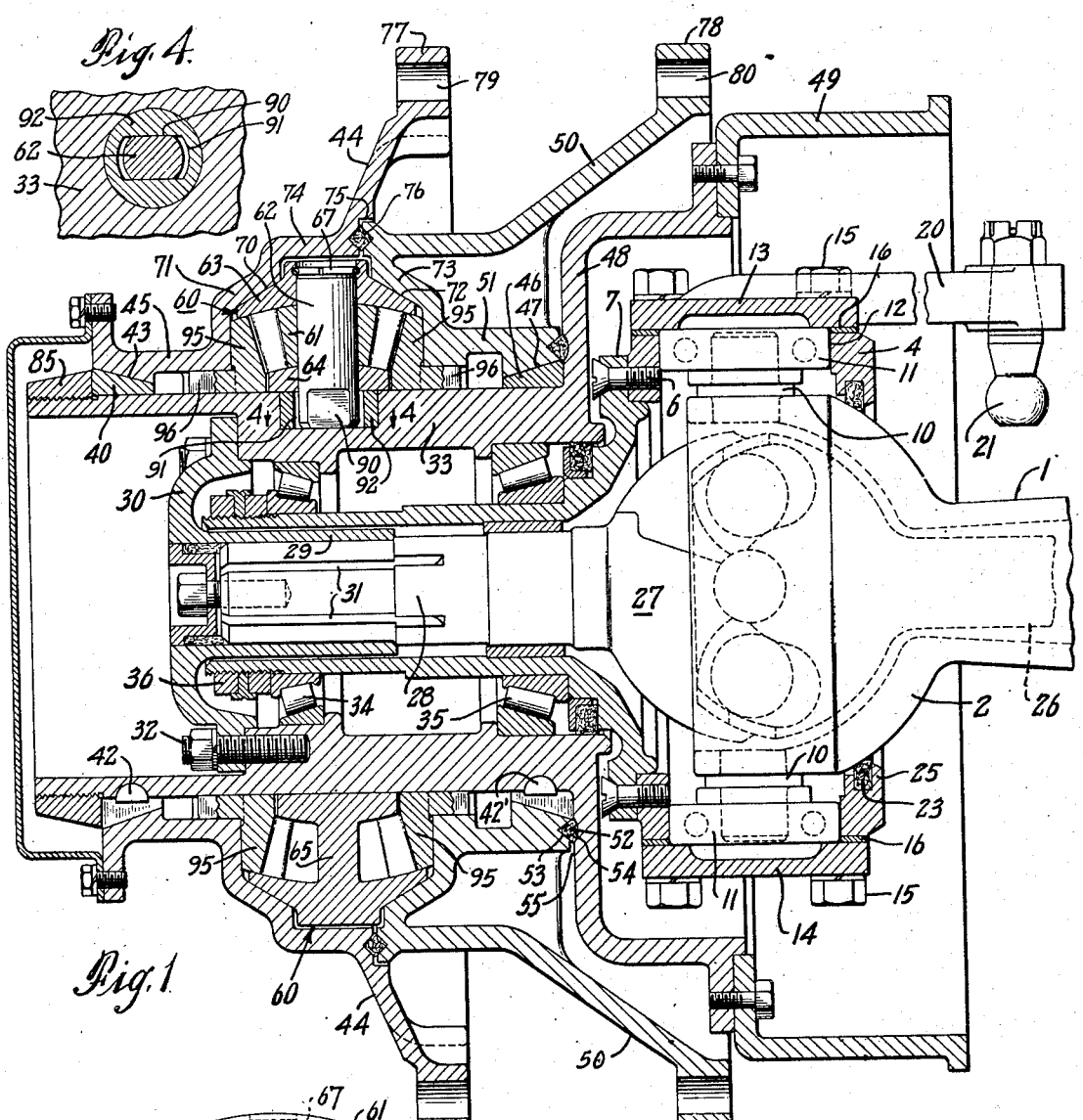
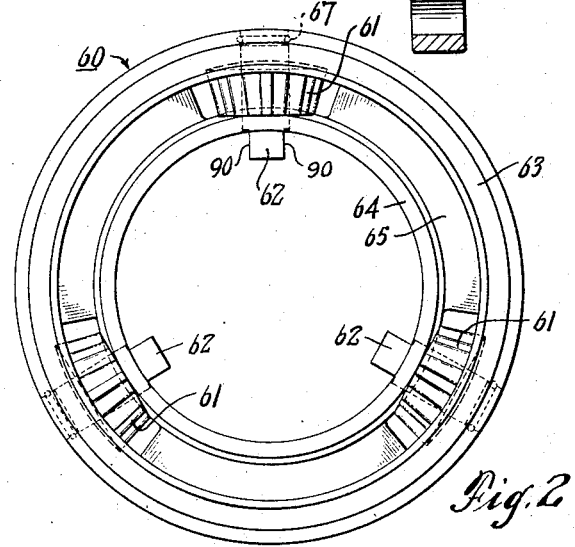
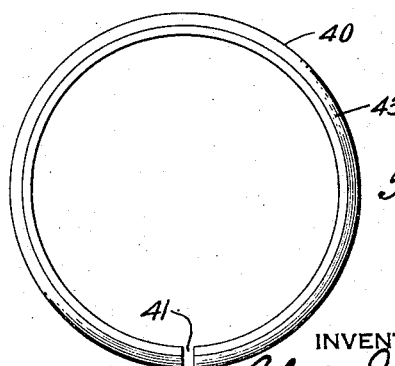
INVENTOR
Charles S. Ash
Morgan Finnegan Durham
ATTORNEYS Dec. 22, 1942.  C. S. ASH  2,305,836

DUAL WHEEL ASSEMBLY

Filed Dec. 14, 1940   2 Sheets—Sheet 2

INVENTOR
Charles S. Ash
BY
Morgan Finnegan & Durham
ATTORNEYS

Patented Dec. 22, 1942

2,305,836

UNITED STATES PATENT OFFICE 2,305,836

DUAL WHEEL ASSEMBLY

Charles S. Ash, Milford, Mich.

Application December 14, 1940, Serial No. 370,113

14 Claims. (Cl. 301—36)

The present invention relates to new and useful improvements in dual wheels for automotive vehicles and more particularly to improvements in bearing construction of dual wheel assemblies.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate several modifications of the invention, and together with the description, serve to explain the principles of the invention.

Of the drawings:

Fig. 1 is a longitudinal section partly in elevation of a dirigible, driven, dual front wheel assembly showing one embodiment of the invention;

Fig. 2 is a face view of a differential pinion ring forming a part of the dual wheel driving means;

Fig. 3 is a face view of one of the bearing rings;

Fig. 4 is a fragmentary axial section showing a pinion support as employed in the form shown in Figs. 1 and 2;

Figure 6:
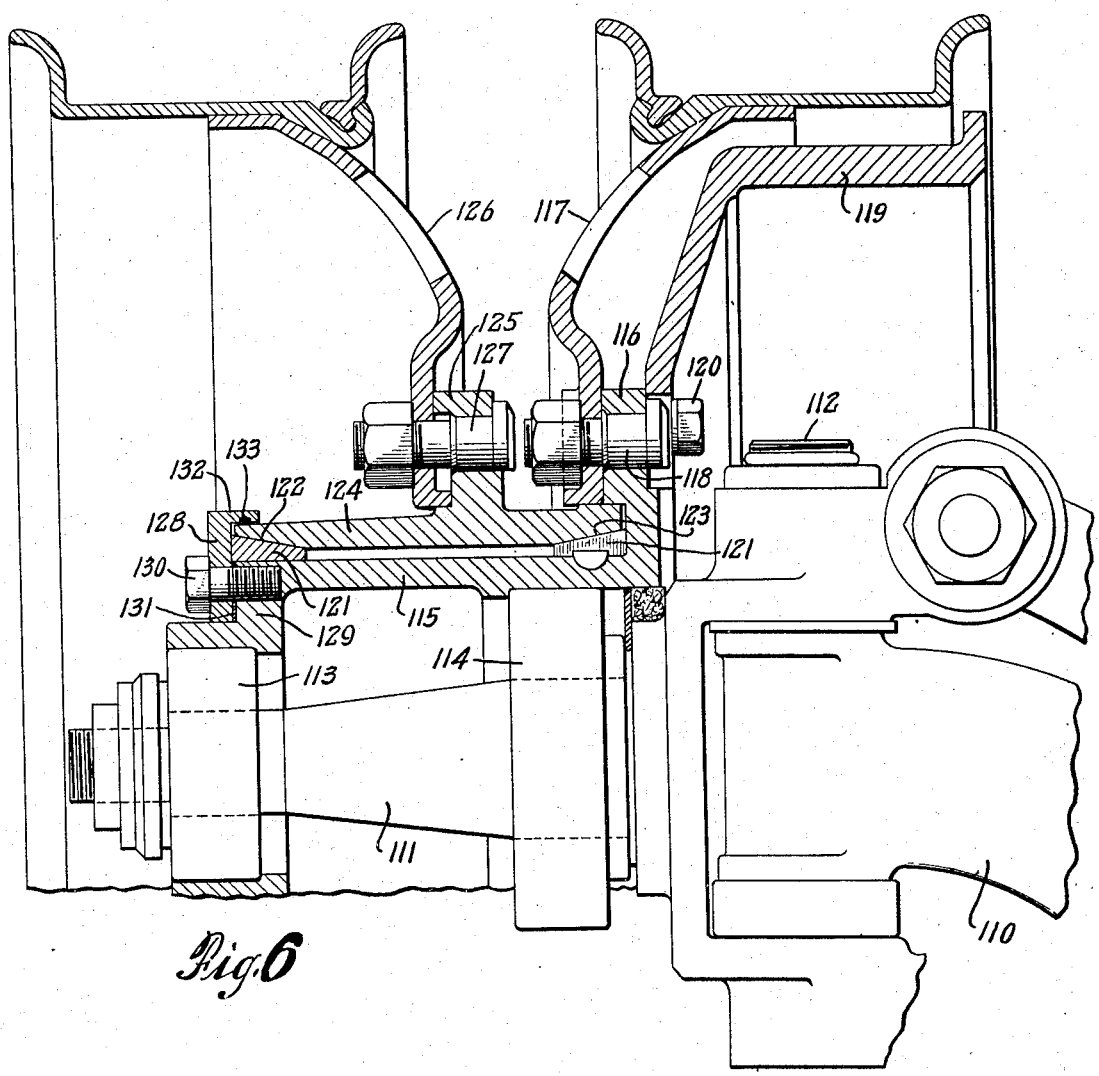
Fig. 6 is a fragmentary longitudinal section partly in elevation of a dirigible non-driven dual wheel assembly embodying another form of the invention.

The present invention has for an object the provision of a novel and improved dual wheel assembly for automotive road vehicles which may be used with dirigible or non-dirigible, driven or non-driven dual wheels. A further object is the provision of an improved wheel construction in which the bearings may be easily and accurately adjusted to compensate for wear. Still another object of the invention is the provision of a wheel construction for driven dual wheels in which improved thrust bearings are provided for the driving members.

It will be understood that the foregoing general description, and the following detailed description as well, are exemplary and explanatory of the invention but are not restrictive thereof.

Referring now in detail to the embodiment of the invention illustrated by way of example in the accompanying drawings, a front axle beam is provided comprising a housing 1 formed to include at its central portion a differential drive (not shown) and having at each end a hollow spherical knuckle 2. Mounted on the knuckle 2 by means of an upper and lower king pin joint is a spindle supporting ring 4 upon the outboard face of which is secured a non-rotatable hollow spindle 5 as by screws 6 and flange 7. The upper and lower king pin connection between the knuckle 2 and the spindle 5 comprises upper and lower shouldered pins 10 axially alined and secured in knuckle 2, and having their outer ends mounted and supported in ball bearing units 11 which are carried in recesses 12 formed in the spindle ring 4.

Plates 13, 14 are secured by cap screws 15 over the recesses 12 in the spindle ring 4 and, by means of shims 16, properly space and retain the bearing units 11 in operative position. Upper plate 13 may be provided with an inwardly extending arm 20 having a pivot stud 21 secured in the end thereof upon which a suitable steering mechanism (not shown) may be attached.

A lubricant seal 23 may be set in a groove formed in an inboard flange 25 of the ring 4 to cooperate with the spheroidal surface of the knuckle 2.

The means whereby the dual wheels may be driven comprise a live shaft 26, driven from the propeller shaft differential (not shown) mounted in axle housing 1, and having its outboard end formed as one element of a suitable universal joint 27, shown here conventionally as a Marmon-Herrington joint. The other element of the universal joint 27 consists of a live stub shaft 28 which projects into the hollow interior of spindle 5 and has mounted thereon an inwardly splined hub 29 of a driving flange 30, key slots 31 being provided in the outboard portion of shaft 28 to cooperate with splined hub 29. Driving flange 30 is attached by stud bolts 32 to a hub member 33 upon which the dual wheels are rotatably mounted and which in turn is journalled upon the spindle 5 by means of roller bearings 34, 35 which may be held in operative position in the usual manner as by retainer nuts 36 threaded upon the end of spindle 5.

Means are provided whereby the dual wheels may be mounted upon hub 33 to permit differential relative rotation thereon, allow adjustment upon the hub to compensate for wear or other maladjustment, and attain sturdy bearing facilities for each wheel. As embodied, there is provided near the outboard end of hub 33 a bearing ring 40, having a split 41 at one point in its circumference of such width as to engage a key 42 carried by the hub whereby the ring 40 may be moved longitudinally upon hub 33 but cannot rotate thereupon. The outer periphery of bearing ring 40 is a tapered surface 43, facing inboard, and constituting the bearing surface upon which is mounted the outboard wheel 44, the hub portion 45 of which is provided with a correspondingly tapered bore. At the inboard end of hub 33 there is provided a second bearing ring 46 similar to ring 40 but having its tapered bearing surface 47 facing outwardly. A key 42' provided in the hub 33 and engaging the split-in ring 46 prevents rotation of the ring upon the hub. The ring 46, contrary to ring 40, is fixed longitudinally upon the hub 33 by abutting the outer face of an annular portion 48 of hub 33 formed thereon. A brake drum 49 may be mounted upon the annular portion 48 of the hub 33 and adapted to cooperate with a brake mechanism (not shown) of suitable design.

Upon the bearing ring 46 there is journalled an inboard wheel 50, dish shaped in form and having an inwardly projecting hub 51 provided with a tapered bore to correspond with the tapered surface 47 of bearing ring 46. A packing ring 52, set into a groove 53 in the inboard face of hub 51 and contacting a groove 54 in the annular portion 48 of hub 33 serves to protect the tapered bearing of ring 46 from external dirt or foreign matter which might find entrance thereto through the clearance 55 between hub 51 and portion 48, which clearance is necessary to allow longitudinal movement or adjustment of wheel 50 on ring 46 to compensate for wear.

Means for driving the wheels 44 and 50 from the main hub 33 so as to permit a differential rotation are provided and as embodied comprise a differential pinion ring 60, mounted upon hub 33, in which are rotatably mounted a plurality of bevel pinions 61 adapted to rotate freely upon stub shafts 62 carried by the pinion ring 60. Pinion ring 60 may be formed as an outer and inner annulus 63, 64 connected by ribs 65, the space between the ends of the ribs providing a chamber 66 for receiving the pinions 61. Stub shafts 62 may be set in bores formed in the outer and inner annuli 63, 64 and retained in place by a spring ring 67 carried in the bores of outer annulus 63 adjacent the ends of the stub shafts 62.

Means are provided for giving supplemental bearing support for the wheels 44 and 50 in addition to that afforded by bearing rings 40 and 46, and as embodied comprises an outwardly tapered bearing surface 70 formed on the outboard periphery of pinion ring annulus 63 upon which a correspondingly tapered portion 71 of outboard wheel 44 bears. The inboard periphery of the annulus 63 is formed with a similar but oppositely directed tapered bearing surface 72 upon which bears a correspondingly tapered portion 73 of inboard wheel 50. The outboard wheel 44 may be provided with a cylindrical portion 74 which bridges over the pinion ring 60 and may be recessed at 75 so as to permit the outer face of the inboard wheel 50 to be nested therein but not in direct contact therewith. A resilient packing ring 76 is interposed between the cylindrical portion 74 of wheel 44 and the nested portion of wheel 50 to exclude foreign matter and retain lubricant as well as to allow limited movement of the two wheels towards each other as adjustment is made to compensate for wear of the wheel bearing surfaces. The wheels 44 and 50 are provided with spoke-like projections 77 and 78 which may be apertured, as at 79 and 80 to receive the usual rim bolts (not shown) by which the rims may be mounted upon the wheels.

Means are provided whereby the adjustment may be made of the tapered bearing ring 40 to compensate for bearing wear or other bearing maladjustment. As embodied, they comprise a nut 85 threaded upon the outer end of main hub 33 and adapted to press against and move inwardly the bearing ring 40. Thus, if an excess of clearance develops at any one of all of the tapered bearing surfaces 43, 70, 72 and 47, it may be reduced to proper dimensions by a tightening of the nut 85 whereby either one or both of the wheels 44 and 50, with their associated parts, or the bearing ring 40 alone will be moved slightly to the right (Fig. 1) and the bearing clearances thereby redefined.

Means are provided for transmitting the rotation of the main hub 33 to the pinion ring 60 and yet permit a limited longitudinal movement of ring 60 on hub 33 as the bearing wear adjustment is made. As embodied, the pinion shafts 62 project inwardly from the bore of ring 60 and are provided with flattened sides 90 which, in operative position, are parallel to the axis of the wheels and engage a slot 91 formed in collars 92 which are fixed in hub 33. The length of slot 91 is greater than the diameter of stub shaft 62 and thereby permits the slight longitudinal movement of ring 60 necessary during bearing wear adjustment. To transmit a differential rotation to the two wheels 44 and 50 from the rotation of pinion ring 60 there is provided in each wheel a bevel ring gear 95 which meshes with the pinions 61 and drives its respective wheel through clutch teeth 96 formed on the ring gear hub and engaging similar teeth formed on the interior of the wheel hubs 45 and 51. The thrust of bevel gear action is transmitted through the wheel hubs and absorbed upon the tapered bearing rings 40 and 46. Thus, it will be seen that as the main hub 33 and pinion ring 60 rotate, this motion is transmitted to the wheels 44 and 50 through pinions 61 and ring gears 95 to whatever extent the road contact of the wheels and tires permit.

Figure 5:
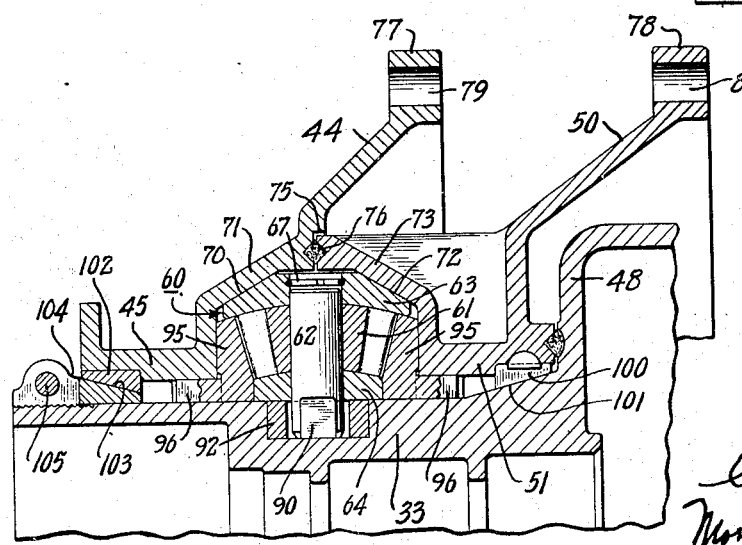
Fig. 5 is a fragmentary section similar to Fig. 1 but showing a modified form of bearing ring construction.

Referring now to Fig. 5 there is shown a modified form of tapered bearing ring construction as applied to the structure just described wherein the tapered bearing surfaces are between the rings and the main hub 33 rather than the rings and the wheels as previously described. As embodied, the inboard wheel hub 51 has a bearing ring 100 keyed therein, the bore of which is a tapered bearing surface adapted to ride upon a correspondingly tapered surface 101 formed on the main hub 33. The outboard wheel hub 45 is similarly provided with a bearing ring 102, keyed thereto in the same manner as ring 100 is keyed to hub 51. The bore of ring 102 is tapered in the opposite direction from ring 100 and adapted to ride upon a correspondingly tapered surface 103 formed upon a nut 104 threaded upon the end of main hub 33. The outer portion of nut 104 is split and provided with a clamp bolt 105 to retain it in the desired position of adjustment which the bearing clearances require. Thus, as bearing wear develops or bearing clearance requires correction, the nut 104 may be unclamped, rotated upon its threads on hub 33 and reclamped, thereby taking up the undesired clearances by movement of rings 100 and 102 along tapered surfaces 101 and 103.

In Fig. 6 there is illustrated a non-driven front dual wheel assembly in which the outboard wheel may be journalled upon the hub of the inboard wheel by a pair of oppositely tapered bearing rings adapted to adjustment for proper bearing clearance in a manner similar to that already described. As embodied, a front axle beam 110 carries a dirigible stub axle 111 by means of the usual king pin connection 112. Upon axle 111 there is mounted, by means of the usual roller bearings 113, 114, a main hub 115 having a flange 116 at its inner end to which may be bolted an inboard wheel and tire rim 117, as by clamp bolts 118. A brake drum 119 may also be secured by cap screws 120 to flange 116.

Upon the inner and outer end of main hub 115 there is keyed a split, tapered bearing ring 121, the respective tapered bearing surfaces of which face towards each other. Journaled upon bearing rings 121 by correspondingly tapered surfaces 122, 123 is an outboard wheel hub 124 which may be provided near its central portion with a flange or lugs 125 to which an outboard wheel and tire rim 126 may be attached by clamp bolts 127.

Means for adjusting the position of the outer bearing ring 121 to compensate for wear or other maladjustment is provided and as embodied comprises a retaining plate 128 secured to a shoulder portion 129 of main hub 115 by screws 130 and provided with a shim 131. The inner face of plate 128 contacts the outer bearing ring 121 and serves to hold it in the desired adjusted position. Plate 128 may be further provided with an inwardly extending rim 132 overlapping the end of outboard hub 124 and provided with a packing ring 133 to seal the tapered bearing 121 against ingress of foreign matter. The length of hub 124 is sufficiently shorter than the minimum adjustable distance between plate 128 and main hub flange 116 to permit the movement of outer bearing ring 121, by plate 128, towards the inner bearing ring 121 as compensation is made for maladjusted bearing clearance.

The invention in its broader aspects is not limited to the specific mechanisms shown and described but departures may be made therefrom within the scope of the accompanying claims without departing from the principles of the invention and without sacrificing its chief advantages.

What I claim is

1. A dual wheel assembly including in combination a support for a plurality of differential pinions includng radial shafts extending from the support and movable axially of the support, a ring surrounding the pinions, supporting the outer ends of the shafts and wheels having hubs at either side of the pinion ring, said hubs having tapered inner portions at each end and fitting over said ring at their adjacent ends, and tapered bearing members at the distant ends of the hubs for rotatably journalling the hubs with respect to the support.

2. A dual wheel assembly including in combination a support for a plurality of differential pinions including radial shafts extending from the support and movable axially of the support, a ring surrounding the pinions, supporting the outer ends of the shafts and wheels having hubs at either side of the pinion ring, said hubs having tapered inner portions fitting over said ring at their adjacent ends and bearing members at the distant ends of the hubs for rotatably journalling the hubs with respect to the support.

3. A dual wheel assembly including in combination a support for a plurality of differential pinions including radial shafts extending from the support and movable axially of the support, a ring surrounding the pinions, supporting the outer ends of the shafts and wheels having hubs at either side of the pinion ring, ring gears rotatable on said support, meshing with said pinions and connected one to each hub and forming a support for the adjacent hub ends on the pinion support, said hubs having tapered inner portions at each end and fitting over said ring at their adjacent ends, and tapered bearing members at the distant ends of the hubs for rotatably journalling the hubs with respect to support.

4. A dual wheel assembly including in combination a support for a plurality of differential pinions including radial shafts extending from the support and movable axially of the support, a ring surrounding the pinions, supporting the outer ends of the shafts and wheels having hubs at either side of the pinion ring, ring gears rotatable on said support, meshing with said pinions and connected one to each hub, and forming a support for the adjacent hub ends on the pinion support, said hubs having tapered inner portions fitting over said ring at their adjacent ends, and bearing members at the distant ends of the hubs for rotatably journalling the hubs with respect to the support.

5. A dual wheel assembly including in combination a sleeve, a pair of side by side coaxial wheels having hubs mounted thereon for relative rotation, a pair of ring gears, one connected to each wheel hub and adjacent each other, a plurality of differential pinions meshing with the ring gears, radial pinion shafts movable axially of the sleeve and drivingly supported by the sleeve, and a ring engaging the outer ends of the shafts forming a thrust bearing for the pinions and spacing the wheels apart at their hubs.

6. A dual wheel assembly including in combination a sleeve, a pair of side by side coaxial wheels having hubs mounted thereon for relative rotation, a pair of ring gears, one connected to each wheel hub and adjacent each other, each of said ring gears having an integral shoulder extending between the hub and sleeve, a plurality of differential pinions meshing with the ring gears, radial pinion shafts movable axially of the sleeve and drivingly supported by the sleeve and a ring engaging the outer ends of the shafts forming a thrust bearing for the pinions and spacing the wheels apart at their hubs.

7. A dual wheel assembly including in combination a sleeve, a pair of side by side coaxial wheels having hubs mounted thereon for relative rotation, a pair of ring gears, one connected to each wheel hub and adjacent each other, each of said ring gears having an integral shoulder extending between the hub and sleeve, a plurality of differential pinions meshing with the ring gears and radial pinion shafts movable axially of the sleeve and drivingly supported by the sleeve.

8. A dual wheel assembly including in combination a sleeve, a pair of side by side coaxial wheels having hubs mounted thereon for independent rotation, a pair of spaced apart tapered bearing members, one for each wheel and means for axially moving one bearing relatively to the other to take up wear.

9. A dual wheel assembly including in combination a sleeve, a pair of side by side coaxial wheels having hubs mounted thereon for independent rotation, a pair of spaced apart tapered bearing members, at the distant ends of the hubs, said tapered bearing members being tapered inwardly towards each other, differential gearing between the wheels at their adjacent hub portions, and means for holding the wheels and bearings against axial movement.

10. A dual wheel assembly including in combination a sleeve, a pair of side by side coaxial wheels having hubs mounted thereon for independent rotation, a pair of spaced apart tapered bearing members at the distant ends of the hubs, said tapered bearing members being tapered inwardly towards each other, and means for holding the wheels and bearings against axial movement.

11. A dual wheel assembly including in combination a pair of coaxial wheel hubs having hollow portions tapered convergingly outwardly, a plurality of differential pinions within said tapered hub portions, a relatively rotatable ring having a correspondingly tapered exterior surface, revolubly supporting said pinions and engaging the tapered hub portions and means preventing axial movement of the hubs.

12. A dual wheel assembly including in combination a pair of coaxial wheel hubs having hollow portions tapered convergingly outwardly, a plurality of differential pinions within said tapered hub portions, a relatively rotatable ring having a correspondingly tapered exterior surface, revolubly supporting said pinions and engaging the tapered hub portions, ring gears connected with each hub and meshing with said pinions, and means preventing axial movement of the hubs.

13. A dual wheel assembly including in combination a pair of coaxial wheel hubs having hollow portions tapered convergingly outwardly, a plurality of differential pinions within said tapered hub portions, a relatively rotatable ring having a correspondingly tapered exterior surface, revolubly supporting said pinions and engaging the tapered hub portions, means preventing rotational movement of said ring while permitting limited axial movement thereof, ring gears connected with each hub and meshing with said pinions, and means preventing axial movement of the hubs.

14. A dual wheel assembly including in combination a mounting, a pair of side by side, independently rotatable, coaxial wheel bodies having hubs, said wheels being rotatable with respect to each other and their mounting, means for holding the wheels against axial movement with respect to each other and their mounting and including tapered journal bearing members, inwardly tapered towards each other, spaced apart and at the innermost and outermost ends of the pair of wheel hubs for journalling the wheels for independent rotation.

CHARLES S. ASH.